United States Patent
Aman

(10) Patent No.: US 9,460,198 B1
(45) Date of Patent: Oct. 4, 2016

(54) PROCESS FOR SERIALIZING AND DESERIALIZING DATA DESCRIBED BY A SCHEMA

(75) Inventor: Robert Matthew Aman, Nairobi (KE)

(73) Assignee: Google Inc., Mountain View, CA (US)

( * ) Notice: Subject to any disclaimer, the term of this patent is extended or adjusted under 35 U.S.C. 154(b) by 392 days.

(21) Appl. No.: 13/559,217

(22) Filed: Jul. 26, 2012

(51) Int. Cl.
G06F 17/30 (2006.01)

(52) U.S. Cl.
CPC ..... *G06F 17/30707* (2013.01); *G06F 17/3056* (2013.01); *G06F 17/30607* (2013.01)

(58) Field of Classification Search
CPC ............ G06F 1/30914; G06F 7/00; G06F 17/30607; G06F 17/30569; G06F 17/30867; G06F 8/427
USPC ................................................ 707/705–780
See application file for complete search history.

(56) References Cited

U.S. PATENT DOCUMENTS

| | | | |
|---|---|---|---|
| 6,366,934 B1 * | 4/2002 | Cheng et al. ................. 715/210 |
| 6,754,670 B1 * | 6/2004 | Lindsay et al. | |
| 8,656,055 B2 * | 2/2014 | Das .............................. 709/246 |
| 8,725,674 B1 * | 5/2014 | Bennett .................. G06Q 30/04 707/601 |
| 2001/0029604 A1 * | 10/2001 | Dreyband et al. ................. 717/7 |
| 2003/0221051 A1 * | 11/2003 | Hand ...................... H04L 29/06 711/106 |
| 2005/0108627 A1 * | 5/2005 | Mireku .................. G06F 1/2288 715/234 |
| 2005/0114394 A1 * | 5/2005 | Kaipa ............... G06F 17/30914 |
| 2006/0218174 A1 * | 9/2006 | Cook, III .............. G06F 9/4435 |
| 2007/0255751 A1 * | 11/2007 | Bansal ...................... G06F 8/10 |
| 2008/0195622 A1 * | 8/2008 | Lelcuk et al. .................... 707/9 |
| 2009/0307229 A1 * | 12/2009 | Kunti ............... G06F 17/30914 |
| 2011/0022611 A1 * | 1/2011 | Yorke .......................... 707/756 |
| 2012/0278702 A1 * | 11/2012 | Base ................ G06F 17/30914 715/239 |

* cited by examiner

*Primary Examiner* — Michelle Owyang
(74) *Attorney, Agent, or Firm* — Lerner, David, Littenberg, Krumholz & Mentlik, LLP

(57) ABSTRACT

A process for serializing and deserializing instance data from a schema is disclosed. A schema can be used to automatically and dynamically generate classes and methods. First, the raw schema may be parsed into an intermediate data structure consisting of <key,value> pairs representing object properties and attributes of the properties. Then, an exemplary process generates new parser classes and methods by iterating over the intermediate data structure's keys and generating classes or class variables based on the property type. Accessors and mutators are generated for each class variable. Additionally, a serialization method and a constructor method are generated for each class. These classes and methods are stored in memory and can be used by a host programming language to transmit, receive, and manipulate data to or from an API.

24 Claims, 13 Drawing Sheets

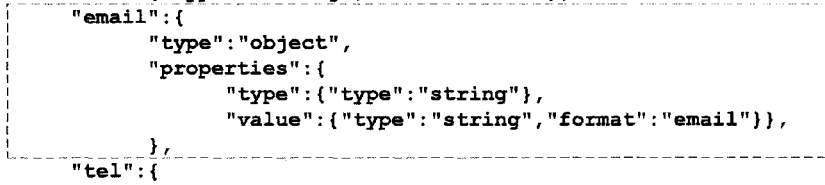

```
{"description":"A representation of a person, company, organization, or place",
 "type":"object",
 "properties":{
      "fn":{"description":"Formatted Name","type":"string"},
      "familyName":{"type":"string", "required":true},
      "givenName":{"type":"string", "required":true},
      "additionalName":{"type":"array","items":{"type":"string"}},
      "honorificPrefix":{"type":"array","items":{"type":"string"}},
      "honorificSuffix":{"type":"array","items":{"type":"string"}},
      "nickname":{"type":"string"},
      "url":{"type":"string","format":"url"},
      "email":{
           "type":"object",
           "properties":{
                "type":{"type":"string"},
                "value":{"type":"string","format":"email"}},
           },
      "tel":{
           "type":"object",
           "properties":{
                "type":{"type":"string"},
                "value":{"type":"string","format":"phone"}},
           },
      "adr":"http://json-schema.org/address",
      "geo":"http://json-schema.org/geo",
      "tz":{"type":"string"},
      "photo":{"format":"image","type":"string"},
      "logo":{"format":"image","type":"string"},
      "sound":{"format":"attachment","type":"string"},
      "bday":{"type":"string","format":"date"},
      "title":{"type":"string"},
      "role":{"type":"string"},
      "org":{"type":"object",
           "properties":{
                "organizationName":{"type":"string"},
                "organizationUnit":{"type":"string"}},
           }
      }
}
```

FIG. 1

```
{"description":"An Address following the convention of http://microformats.org/wiki/hcard",
 "type":"object",
 "properties":{
      "post-office-box":{"type":"string","requires":"street-address"},
      "extended-address":{"type":"string","requires":"street-address"},
      "street-address":{"type":"string","requires":"region"},
      "locality":{"type":"string","requires":"region", "required":true},
      "region":{"type":"string","requires":"country-name", "required":true},
      "postal-code":{"type":"string"},
      "country-name":{"type":"string", "required":true}
      }
}
```

FIG. 2a

```
{"description":"A geographical coordinate",
 "type":"object",
 "properties":{
      "latitude":{"type":"number"},
      "longitude":{"type":"number"}
      }
}
```

FIG. 2b

```
{"description":"A binary tree node",
 "type": ["object", "null"]
 "properties":{
        "left":{"$ref" : "node.json"},
        "right":{"$ref" : "node.json"},
        "value":{"type":"any"}
    }
}
```
                                                      301

FIG. 3

PARSE Schema for Classes/Objects

| KEY | VALUE | | | | | |
|---|---|---|---|---|---|---|
| description | A representation of a person, company, organization, or place | | | | | |
| type | object | | | | | |
| properties | KEY | VALUE | | | | |
| | fn | KEY | VALUE | | | |
| | | description | Formatted Name | | | |
| | | type | string | | | |
| | familyName | KEY | VALUE | | | |
| | | type | string | | | |
| | | required | true | | | |
| | givenName | KEY | VALUE | | | |
| | | type | string | | | |
| | | required | true | | | |
| | additionalName | KEY | VALUE | | | |
| | | type | array | | | |
| | | items | KEY | VALUE | | |
| | | | type | string | | |
| | honorificPrefix | KEY | VALUE | | | |
| | | type | array | | | |
| | | items | KEY | VALUE | | |
| | | | type | string | | |
| | honorificSuffix | KEY | VALUE | | | |
| | | type | array | | | |
| | | items | KEY | VALUE | | |
| | | | type | string | | |
| | nickname | KEY | VALUE | | | |
| | | type | string | | | |
| | url | KEY | VALUE | | | |
| | | type | string | | | |
| | | format | url | | | |
| | email | KEY | VALUE | | | |
| | | type | object | | | |
| | | properties | KEY | VALUE | | |
| | | | type | KEY | VALUE | |
| | | | | type | string | |
| | | | value | KEY | VALUE | |
| | | | | type | string | |
| | | | | format | email | |

FIG. 5

```
class BusinessCard
    attr_accessor  :fn
    attr_accessor  :familyName
    attr_accessor  :givenName
    attr_accessor  :additionalName
    attr_accessor  :honorificPrefix
    attr_accessor  :honorificSuffix
    attr_accessor  :nickname
    attr_accessor  :url
    attr_accessor  :email
    attr_accessor  :tel
    attr_accessor  :adr
    attr_accessor  :geo
    attr_accessor  :tz
    attr_accessor  :photo
    attr_accessor  :logo
    attr_accessor  :sound
    attr_accessor  :bday
    attr_accessor  :title
    attr_accessor  :role
    attr_accessor  :org def initialize (schema_instance)
    # defines a new business card
    # instance
    # from a schema instance parameter
    end def serialize()
    # serializes the business card object
    end
end class email
 attr_accessor  :type, :format
end class tel
 attr_accessor  :type, :format
end class adr
 attr_accessor  :street1, :street2, :city,
:state/province, :zip/postal code, :country
end class geo
 attr_accessor  :lat, :long
end class org
 attr_accessor  :organizationName,
:organizationUnit
end
```

FIG. 7

```
{
  {
    "fn"=> "Robert M. Aman",
    "familyName"=>"Aman",
    "givenName"=>"Robert",
    "additionalName"=>["Danger"],
    "nickname"=> "Bob",
    "url"=>"https://plus.google.com/112343",
    "email"=>
        {
                "type"=> "personal",
                "value"=> "hello@hello.com"
        },
    "telephone"=>
        {
                "type"=> "home",
                "value"=> "(555)234-1678"
        },
     "org"=> {
                "organizationName" => "DLD",
                "organizationUnit"=> "code"
        }
  }
}
```

FIG. 8

| KEY | VALUE | | |
|---|---|---|---|
| fn | Robert M. Aman | | |
| familyName | Aman | | |
| givenName | Robert | | |
| additionalName | ["Danger"] | | |
| nickname | Bob | | |
| url | https://plus.google.com/112343 | | |
| email | KEY | VALUE | |
| | type | personal | |
| | value | hello@hello.com | |

FIG. 9

```
instance = BusinessCard.new (    {
        "fn"=> "Robert M. Aman" ,
        "familyName"=>"Aman",
        "givenName"=>"Robert",
        "additionalName"=>["Danger"],
        "nickname"=> "Bob",
        "url"=>"https://plus.google.com/112343",
        "email"=>
    {
            "type" > "personal",
            "value" > "hello@hello.com"
            },
     "telephone" >
    {
            "type" > "home",
            "value" > "(555)234-1678"
    },
        "org" > {
            "organizationName"  > "DLD",
            "organizationUnit" > "code"
    }
})

instance.given_name #"Robert"
instance.family_name #"Aman"
instance.additional_name #["Danger"]
instance.family_name #"Aman"
instance.nickname #"Bob"
instance.url #"https://plus.google.com/112343"
instance.email.type #"personal"
instance.email.value #"hello@hello.com"
instance.telephone.type #"home"
instance.telephone.value #"(555)234-1678"
instance.org.organization_name #"DLD"
instance.org.organization_unit #"code"
```

FIG. 10

PROCESS FOR SERIALIZING AND DESERIALIZING DATA DESCRIBED BY A SCHEMA

BACKGROUND

Web services provide access to various types of data such as maps, email, news, and social networking information. Web service providers often provide application programming interfaces (APIs) so that software developers can have controlled access to web services and data. An API is a code-based specification which allows software components to communicate with one another. APIs may contain information such as the methods available and the data returned by the available methods from a particular web service.

For example, a web service provider may create a web mapping service and provide a Map API for software developers to access the mapping service's functionality. The Map API may contain information about the web mapping service including methods to obtain: directions to a place, the travel distance between places, the travel time between places, and a place's elevation. If a software developer is building an application for a fast food restaurant, the developer may want to use the Map API to allow a user to request directions to the restaurant from the user's current location. The developer does not have to write the map-specific code to obtain directions, but can instead use the Map API to access the web service provider's functionality and obtain the directions. The developer can write code that calls the methods that are defined by the API and uses the data that is returned from the methods.

Most API providers also give developers a client library and/or documentation which demonstrates how to retrieve data objects from their respective APIs. An API client library may include a discovery document as generated code which shows a developer how to access objects and methods. The discovery document is structured data that may contain: (1) a list of API resource schemas that describe the data developers have access to in each API, (2) a list of API methods and available parameters for each method, and (3) the format of the information that will be returned from each method when the method is accessed.

Data typically needs to be serialized by a web service before it is sent to a remote client. Serialization is the process of converting classes and objects into a linear sequence of bytes for either storage or transmission to another location. Often the linear sequence of bytes is represented as a string. Data also needs to be deserialized into classes and objects when the data is received via an API by the remote client. Deserialization is the process of taking in the linear sequence of bytes and recreating classes and objects from these bytes. Most data conversion software for serialization and deserialization is written by hand and parses data into manually-created classes and objects. While this approach may be viable for a small number of APIs, mistakes are likely when data must be parsed for numerous APIs or when APIs are frequently updated.

SUMMARY

This specification describes technologies relating to serializing and deserializing data and specifically to a method for dynamically generating classes and objects from a schema at runtime.

In general, one aspect of the subject matter described in this specification can be embodied in a system and method for dynamically generating classes and methods in memory. An exemplary system includes one or more processing devices and one or more storage devices. The storage devices store instructions that, when executed by the one or more processing devices, cause the one or more processing devices to: receive a schema, which describes the format and properties of instance data to be transmitted or received; use a client library to convert the raw schema data into an intermediate key,value pair data structure with each key representing a property of the object; dynamically generate parser classes and methods using associative values representing the attributes of the corresponding property which include a type attribute; and store the generated parser classes and methods in memory. An exemplary method includes: receiving a schema, which describes the format and properties of instance data to be transmitted or received; using a client library to convert the raw schema data into an intermediate key,value pair data structure with each key representing a property of the object; dynamically generating parser classes and methods using associative values representing the attributes of the corresponding property which include a type attribute; and storing the generated parser classes and methods in memory.

These and other embodiments can optionally include one or more of the following features: dynamically generating parser classes and methods comprises iterating over the property keys, for each property using the associative values representing the attributes of the property to generate a class variable, and defining accessors and mutators for each class variable; defining a new parser class for the property if the property's type attribute is of non-scalar, non-array value; responsive to the presence of a validation attribute, adding validation information to the accessor or mutator of the corresponding property; responsive to the presence of a data transformation attribute, adding data transformation information to the accessor or mutator of the corresponding property; generating a serialization method on the new parser class that converts the parser class into a serialized format; generating a parser class constructor which takes unparsed instance data as a parameter and returns an instance object with properties set to values from the instance data; and matching the property to the defined types in the order that the types are listed in the schema and responsive to a match, using the matching type to create the class property.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1 is an example Java Script Object Notation (JSON) schema describing a business card.

FIG. 2a is an example JSON schema describing an address.

FIG. 2b is an example JSON schema describing a geographical coordinate.

FIG. 3 is an example JSON schema describing a binary tree node.

FIG. 5 is an example <key,value> pair structure representing a business card.

FIG. 7 is an example ruby class diagram for a business card.

FIG. 8 is an example JSON schema data describing an instance of a business card.

FIG. 9 is an example <key,value> pair structure representing an instance of a business card.

FIG. 10 is an example of instantiating a business card class and the values of the class variables after instantiation.

TERMS

Figure 4:
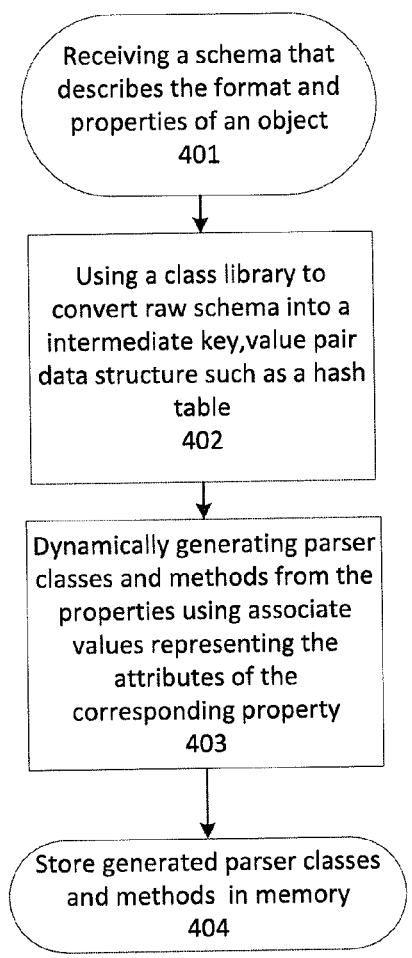
FIG. 4 is a flow diagram of an exemplary method for deserializing data from a schema.

"Schema data" refers to a serialized, unprocessed version of a schema.

"Parser class" means the in-memory representation of a schema that can be used to process instance data.

"Instance data" may refer to either the serialized, unprocessed data an API uses in request and response bodies and as parameters to remote procedure calls. "Instance data" may also refer to the intermediate, partially processed form generated by JSON or XML libraries.

"Instance object" is the fully-processed in-memory representation of instance data.

"Property data" refers to the data elements that make up an instance object.

DETAILED DESCRIPTION

According to an exemplary embodiment, a schema can be used to automatically and dynamically serialize and deserialize instance data that is transmitted to or received from an API client.

A schema is a framework that helps organize and interpret information. A schema is typically used to define validation rules and verify received data. Some schemas describe data objects, data objects interrelationships, and methods. A schema may be available through a customary discovery document. The schema in the discovery document may describe the data to which a developer has access from an API. Although a schema may be obtained through a discovery document, there are alternative mechanisms by which a schema may be obtained.

FIG. 1 depicts an example schema for a business card object. In FIG. 1, the schema specifies that each instance of a business card is a representation of a person, company, organization, or place. A business card object may have properties such as: a formatted name; family name; given name; additional names; honorific prefix; honorific suffix; nickname; url; email address; telephone number; address; geographic location; photo; logo; sound; birthday; title; role; and organization. As shown in FIG. 1, the schema for a business card object defines the properties that a card object may contain as well as the data type and the data validation required for each property.

FIG. 1 also shows that schemas may contain other schemas. (101) Schemas inside of other schemas are referred to as "nested schemas." In FIG. 1's example schema, the business card property "email" contains a schema (101) that defines the characteristics of an email. This email schema is nested within the business card schema. The email schema (101) includes an email type property and an email address value property. In FIG. 1, the telephone property (tel) and the organization property (org) also contain schemas that are nested within the business card schema.

Schemas may additionally be defined in separate files from one another. For example, in FIG. 1 the properties "adr" and "geo," defining an address and a geographic location respectively, contain definitions that reference urls. The actual object definitions of these properties exist in the file that is defined by the url. These properties' schemas are shown in FIGS. 2a and 2b.

Schemas may also extend other schemas, creating an inheritance relationship between the schemas. A schema that extends another schema is called a child schema and will inherit all properties and constraints from the inherited, parent, schema. The inheritance relationship requires that any instance of a child schema be validated against the parent schema.

Schemas may also reference themselves as illustrated in FIG. 3. FIG. 3 shows a schema which defines a binary tree node called node.json. The schema has references to itself in each of its properties. The schema defines two properties, left and right, which refer to node.json since both properties are also binary tree nodes.

As discussed above, instance data typically needs to be serialized and deserialized when it is transmitted to and from a remote client. Parser classes are created in order to perform deserialization. Instance objects are used to perform generation. Parser classes parse data often from strings and generators generate objects from the parsed data. Often, these classes are created manually. Although the manual creation of parsers and generators for serialization and deserialization is typically time-consuming and error prone, a schema may be used to automate the process, making it more efficient and consistent.

As illustrated in FIG. 4, an exemplary process for automatically and dynamically serializing and deserializing instance data that is transmitted to or received from an API begins with receiving schema data that describes the expected format of instance data which is transmitted from an API method (401). In some embodiments, this schema is included with a discovery document. A typical discovery document may contain several schemas. For very large, complex APIs, a discovery document may contain hundreds of schemas.

The raw schema data may then be parsed into an intermediate <key,value> pair data structure such as a hash table (402). Parsing is the process of analyzing data and separating the data into parts by following a set of defined rules. For example, given the JSON schema of FIG. 1, an intermediate parsing step may divide the JSON into <key,value> pairs based on given delimiters. This intermediate parsing step is usually done by a library such as a JSON or XML parsing library. A serialization format may use delimiters such as ":" and "," to separate the data into <key,value> pairs. FIG. 5 illustrates how the business card schema of FIG. 1 may be parsed into a data structure of nested <key,value> pairs. In FIG. 5, the top-level keys of the business card data structure are "description," "type," and "properties." (501) Under "properties," there are several nested <key,value> pairs representing the properties of a business card (502). Each property may contain more nested <key,value> pairs representing the attributes of that property.

Once schema data is deconstructed into an intermediate data structure, an exemplary process generates new parser classes and methods based on the structured properties (403). These parser classes and their methods are stored in memory and can be used by a host programming language to transmit, receive, and manipulate instance data to or from an API (404).

A host programming language is a language in which the application using the API is written. If a host programming language is a compiled language, the classes and methods are generated prior to compiling. If the host programming language is a dynamic language, the new parser classes and methods may be generated at runtime. One difference between a compiled language and a dynamic language is that a compiled language requires code generation and a subsequent compile step. These compiled languages usually cannot define a class and corresponding methods at runtime. Examples of compiled languages are Java and C++. Dynamic languages can create classes and methods at runtime. Examples of dynamic languages include Ruby, PHP, and Python. Dynamically defining the classes and corresponding methods at runtime is beneficial to developers because dynamic definitions of classes and methods can respond to changes in a schema without recompiling and potentially without even restarting the application.

Figure 6:
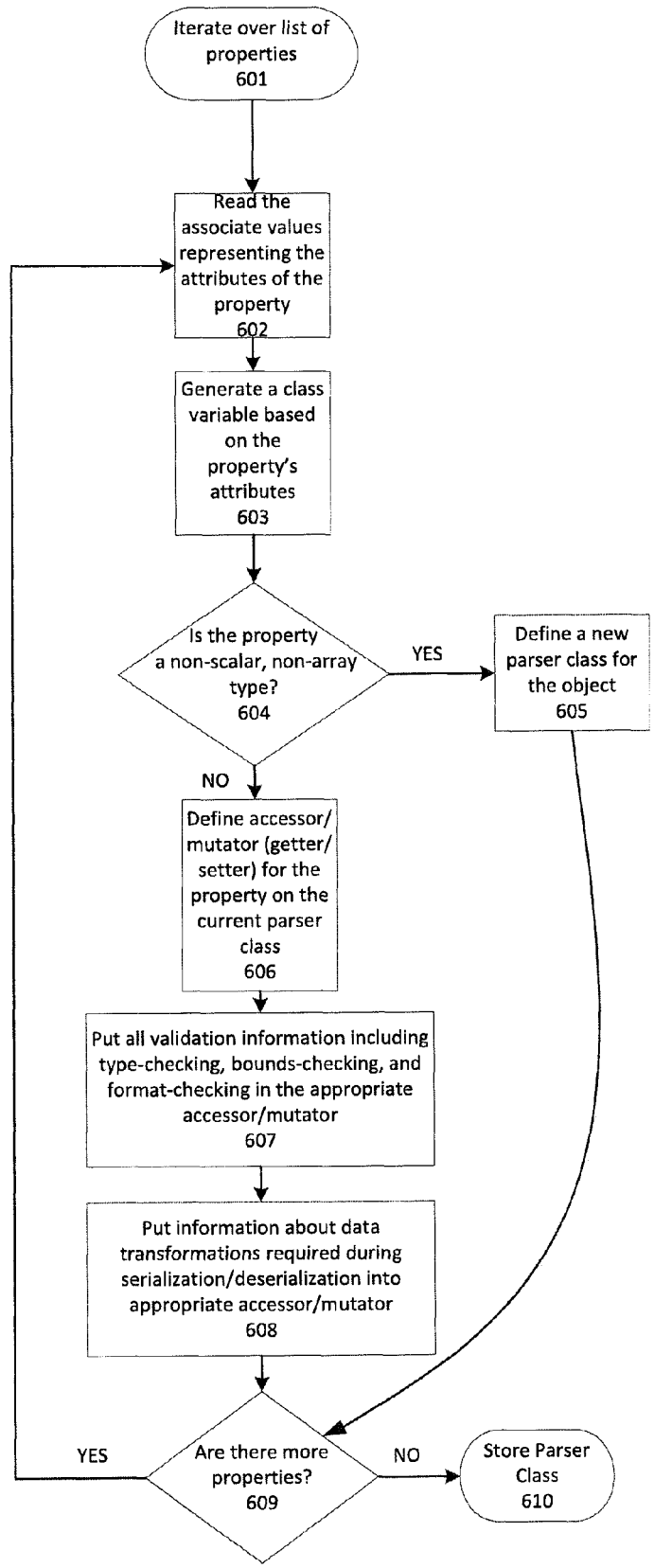
FIG. 6 is a flow diagram of an exemplary method for deserializing data from a schema.

Aspects of the inventive concepts include an exemplary process for analyzing schema data to create a parser class defined by the given schema. The process iterates over the list of properties defined by the schema as illustrated in FIG. 6 (601). For each property in the schema, the process reads associative values representing the attributes of the property to generate a class variable (602). If the property references another schema, the reference, or memory address, is followed to obtain the actual referenced schema. The given schema is then checked to see if it or any of its referenced schemas extend other schemas. If there are inheritance relationships, all parent properties are incorporated into the children. Additionally, any definition of a property in the child schema that shares a name with a property in the parent schema is merged with the parent schema's property definition.

Next, a new parser class may be generated for non-scalar, non-array properties defined by the given schema (605). Non-scalar, non-array properties are often types of objects or unions. An object type is an entity that consists of data properties and methods. A union type is an entity that can be one of several types or formats. A union type is represented as an array of several formats from which the actual data type can be chosen. For example, the binary tree schema of FIG. 4 describes a union. In FIG. 4, the binary tree type is defined as ["object", "null"]. Given this union type definition, the exemplary process will try to assign the property data first as an object type since that was the first type declared. If the property does not match an object, the process will define the property data as "null." Once the actual type of a union property has been determined, either a class or a class variable can be created for that property.

A new parser class is created for every object type in a schema and for the schema itself. The parser class may include class variables, as discussed below, and accessors and mutators to update and retrieve these variables. Every new parser class also stores the schema from which it was generated and contains a static method that returns this raw schema. Each parser class additionally includes a constructor which takes a single parameter that is an unparsed schema data. The constructor returns an instance object with the instance data that was passed to the constructor via the schema data. New parser classes may furthermore be generated with a serialize method that when called will translate the class object into serialized data that can be transmitted or stored.

While some new parser classes are generated with names so that they can be accessed directly, such as the business card class in FIG. 7, other new parser classes are generated without named identifiers and can only be accessed by reference. These classes are referred to as anonymous classes.

In addition to generating parser classes, the exemplary process generates class variables for each data property in a schema and associates these properties with their corresponding class based on the schema definition and the nested hierarchy (603). For example, given the business card schema of FIG. 1, a business card class may have class variables for a formatted name; family name; given name; additional names; honorific prefix; honorific suffix; nickname; url; email address; telephone number; address; geographic location; photo; logo; sound; birthday; title; role; and organization.

The process may also generate accessor and mutator methods for each defined class variable (606). These accessor and mutator methods may perform all necessary type-checking, bounds-checking, and format-checking for the data variable as required by the schema (607). These methods may also perform any data transformations required during serialization or deserialization. FIG. 7 illustrates an exemplary Ruby class based on the schema from FIG. 1. "attr_accessor" is short hand notation for accessors and mutators. The constructor is represented by the "initialize" method which takes in schema data. Parser classes for email, telephone, address, geographic location, and organization are also shown. Although all parser classes are shown in the same file, in some embodiments these classes can be generated in several different files, and can also be generated one per file.

In some embodiments, non-scalar, non-array type variables are represented by automatically generated classes. For example, the email variable of FIG. 7 may be its own class. The email class may contain class variables such as type and value to keep track of a type of email account, such as "home" or "work," and the actual email address value. Class variables can be one of several types including: string; a particular object; integer; any, which is considered a completely unparsed value; and array.

FIG. 8 depicts exemplary schema data of a business card object. Schema data contains data that conforms to the format described by the schema, with the data properties having actual values associated with them. Schema data can be written in several formats including JSON and XML. In order to instantiate a class using this data, the schema data is passed to a constructor of the Business Card class as described above. The constructor method may use a class library to parse the schema data into <key,value> pairs as shown by FIG. 9. The method may then iterate over all the instant data properties to create a new business card class instantiation. An example instantiated class is illustrated in FIG. 10.

Figure 11:
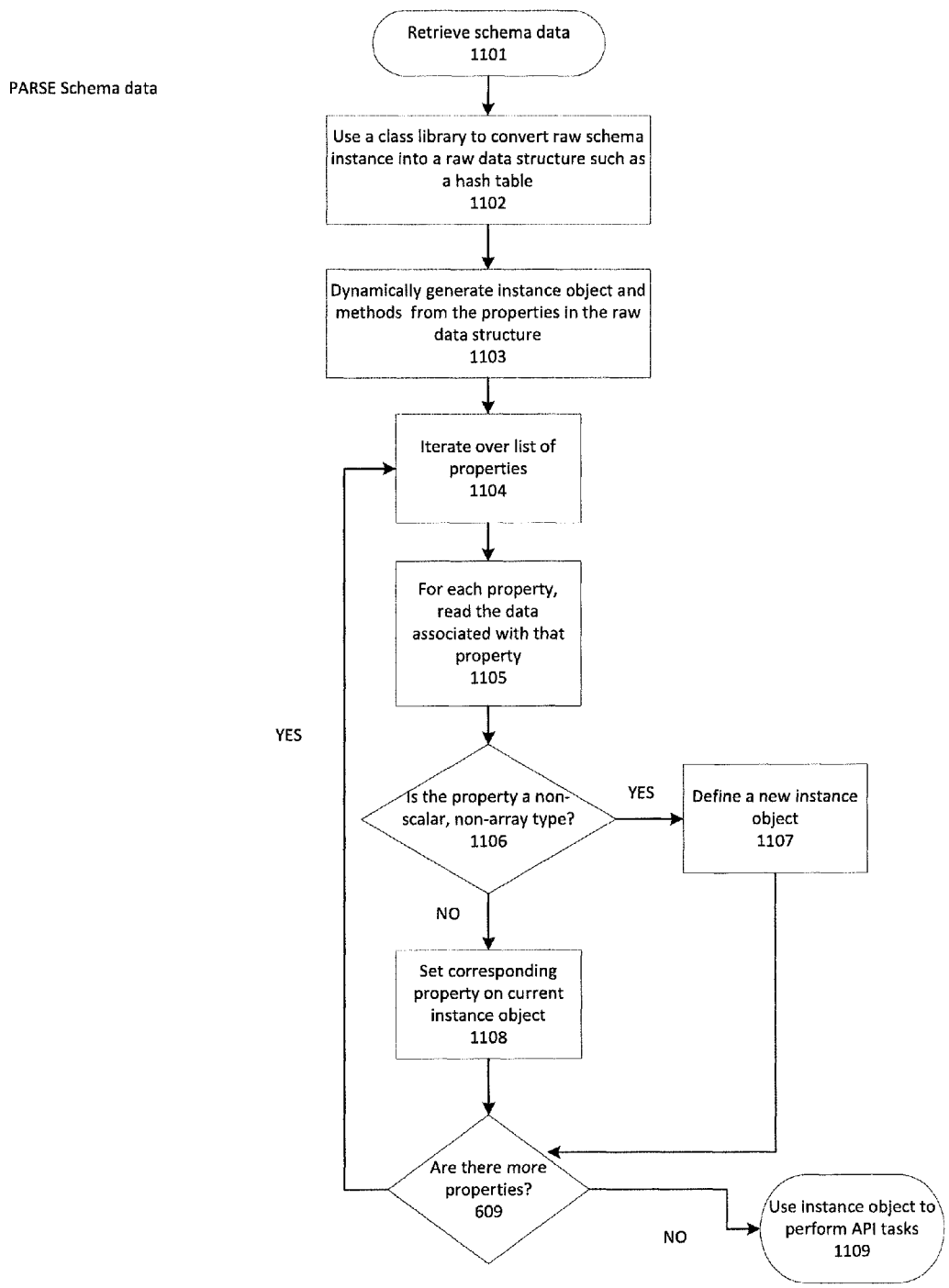
FIG. 11 is a flow diagram of an exemplary method for deserializing data from schema data.

FIG. 11 illustrates an exemplary process for creating an instance object based on schema data. The process is similar to the process for creating a parser class based on schema data that is discussed above. However, instead of generating classes and methods, classes are instantiated for each object and instance properties are set using the mutators defined by the parser class. Instance properties may automatically enforce any constraints described by the schema.

An instance object may have a serialization method as depicted in the Business card class illustrated in FIG. 7. This serialization method may be created when the class is generated and may show how to marshal the object, meaning convert the instance object into a serialized format. When a developer calls the serialization method, the class object is changed from an object into a linear sequence of bytes for either storage or transmission to another location. By using dynamically generated classes and methods to serialize and deserialize instance data from a schema, data conversion can be consistent and efficient.

Aspects of the inventive concepts are designed to simplify the creation of parser classes to perform deserialization and instance objects to perform serialization. An exemplary embodiment allows for a single client per programming language to automatically create parser and generator classes in the programming language for serialization and deserialization instead of these classes having to be created manually. Schema data is used in order to automatically create parser classes and instance objects. Although schemas were originally intended to validate instance data, in an exemplary embodiment schemas may be used to dynamically generate object-oriented in-memory representations of serialized instance data. Clients provide developers with interfaces that are easy to use, easy to maintain, and capable of the serialization and deserialization necessary when data is being transmitted.

Figure 12:
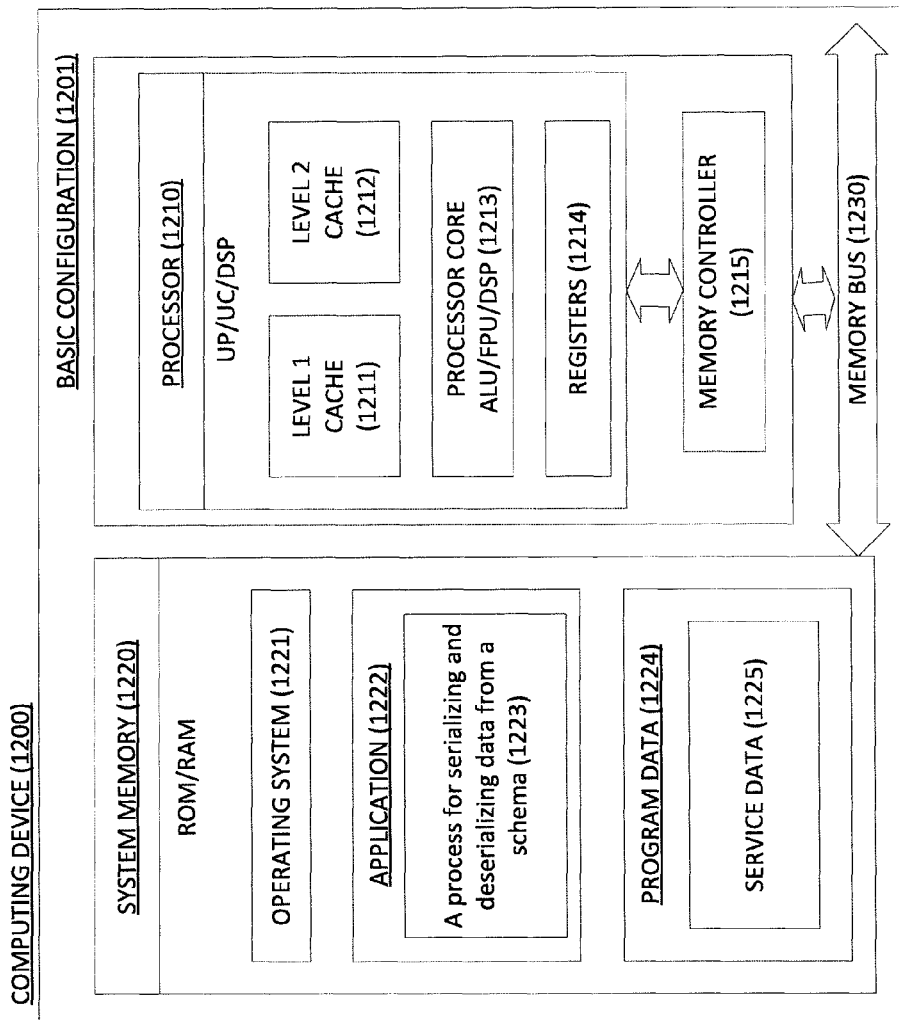
FIG. 12 is a block diagram illustrating an exemplary computing device.

FIG. 12 is a block diagram illustrating an example computing device (1200) that is arranged for serializing and deserializing data described by a schema. In a very basic configuration (1201), the computing device (1200) typically includes one or more processors (1210) and system memory (1220). A memory bus (1230) can be used for communicating between the processor (1210) and the system memory (1220).

Depending on the desired configuration, the processor (1210) can be of any type including but not limited to a microprocessor (μP), a microcontroller (μC), a digital signal processor (DSP), or any combination thereof. The processor (1210) can include one more levels of caching, such as a level one cache (1211) and a level two cache (1212), a processor core (1213), and registers (1214). The processor core (1213) can include an arithmetic logic unit (ALU), a floating point unit (FPU), a digital signal processing core (DSP Core), or any combination thereof. A memory controller (1216) can also be used with the processor (1210), or in some implementations the memory controller (1215) can be an internal part of the processor (1210).

Depending on the desired configuration, the system memory (1220) can be of any type including but not limited to volatile memory (1204) (such as RAM), non-volatile memory (1203) (such as ROM, flash memory, etc.) or any combination thereof. System memory (1220) typically includes an operating system (1221), one or more applications (1222), and program data (1224). The application (1222) includes an application that can perform large-scale data processing using parallel processing. Program Data (1224) includes storing instructions that, when executed by the one or more processing devices, implement a method for serializing and deserializing data described by a schema. In some embodiments, the application (1222) can be arranged to operate with program data (1224) on an operating system (1221).

The computing device (1200) can have additional features or functionality, and additional interfaces to facilitate communications between the basic configuration (1201) and any required devices and interfaces. For example, a bus/interface controller (1240) can be used to facilitate communications between the basic configuration (1201) and one or more data storage devices (1250) via a storage interface bus (1241). The data storage devices (1250) can be removable storage devices (1251), non-removable storage devices (1252), or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory (1220), removable storage (1251), and non-removable storage (1252) are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of the device (1200).

The computing device (1200) can be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device (1200) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for dynamically generating classes and methods in memory in order for a host programming language to transmit or receive instance data to or from an application programming interface comprising:
   receiving a schema, which describes the format and properties of instance data to be transmitted or received;
   converting, using a client library, raw schema data into an intermediate hierarchical data structure, an upper level of the hierarchical data structure including the properties of the instance object, and each property including data representing attributes of that property;
   dynamically at runtime generating parser classes for deserialization and methods from the properties and attributes described in the intermediate hierarchical data structure based on the schema, wherein generating the parser classes comprises:
      iterating over each property defined in the schema and in any other schema referenced in the schema, and
      defining a new class for each non-scalar, non-array property defined by the schema; and
   storing the generated parser classes and methods in memory in order for the host programming language to transmit or receive instance data to or from the application programming interface.

2. The computer-implemented method of claim 1 wherein dynamically generating parser classes and methods further comprises:
   for each property, reading associative values representing the attributes of the property to generate a class variable; and
   associating each class variable with accessor and mutator methods.

3. The computer-implemented method of claim 2, wherein the accessor and mutator methods perform all type-checking, bounds-checking, and format-checking required by the schema.

4. The computer-implemented method of claim 2 further comprising:
   responsive to a presence of a validation attribute, adding validation information to the accessor or the mutator of the class variable to which the validation attribute corresponds.

5. The computer-implemented method of claim 2, wherein the accessor and mutator methods perform data transformations during serialization or deserialization.

6. The computer-implemented method of claim 1 further comprising:
   generating a serialization method on the new parser class that converts the new parser class into a serialized format.

7. The computer-implemented method of claim 1 further comprising:
   creating a new parser class for every object type in the schema and for the schema itself.

8. The computer-implemented method of claim 1, further comprising:
   for each union type, matching the property to defined types in an order that the types are listed in the schema; and
   responsive to a match, using a matching defined type to create a class property.

9. A non-transitory computer-readable medium having stored therein computer executable code that causes one or more processors to execute the steps of:
   receiving schema data, which describes the format and properties of an instance object to be transmitted or received;
   converting, using a class library, raw schema data into an intermediate hierarchical data structure, an upper level of the hierarchical data structure including the properties of the instance object, and each property including data representing attributes of that property;
   dynamically at runtime generating parser classes for deserialization and methods from the properties and attributes described in the intermediate hierarchical data structure based on the schema, wherein generating the parser classes comprises:
      iterating over each property defined in the schema and in any other schema referenced in the schema, and
      defining a new class for each non-scalar, non-array property defined by the schema; and
   storing the generated parser classes and methods in memory in order for a host programming language to transmit or receive instance data to or from an application programming interface.

10. The non-transitory computer-readable medium of claim 9 wherein dynamically generating parser classes and methods further comprises:
    for each property, reading associative values representing attributes of the property to generate a class variable; and
    associating each class variable with accessor and mutator methods.

11. The non-transitory computer-readable medium of claim 10, wherein the accessor and mutator methods perform all type-checking, bounds-checking, and format-checking required by the schema.

12. The non-transitory computer-readable medium of claim 10 further comprising:
    responsive to a presence of a validation attribute, adding validation information to the accessor or the mutator of the class variable to which the validation attribute corresponds.

13. The non-transitory computer-readable medium of claim 10, wherein the accessor and mutator methods perform:
    data transformations during serialization or deserialization.

14. The non-transitory computer-readable medium of claim 9 further comprising:

generating a serialization method on the new parser class that converts an instance object into a serialized format.

15. The non-transitory computer-readable medium of claim 9 further comprising:
creating a new parser class for every object type in the schema and for the schema itself.

16. The non-transitory computer-readable medium of claim 9, further comprising:
a property with a type attribute of union, which defines more than one type;
matching the property to defined types in an order that the defined types are listed in the schema; and
responsive to a match, using a matching defined type to create a class property.

17. A system for dynamically generating classes and methods in memory comprising:
a host programming language that transmits or receives instance data from an application programming interface;
one or more computing devices; and
one or more non-transitory storage devices storing instructions that, when executed by the one or more computing devices, cause the one or more computing devices to:
receive a schema, which describes the format and properties of an instance object to be transmitted or received;
convert, using a client library, raw schema data into an intermediate hierarchical data structure, an upper level of the hierarchical data structure including the properties of the instance object, and each property including data representing attributes of that property;
dynamically at runtime generate parser classes for deserialization and methods from properties and attributes described in the intermediate hierarchical data structure based on the schema, wherein generating the parser classes comprises:
iterating over each property defined in the schema and in any other schema referenced in the schema, and
defining a new class for each non-scalar, non-array property defined by the schema; and
store the generated parser classes and methods in memory,
wherein the host programming language transmits or receives instance data to or from the application programming interface using the generated parser classes and methods.

18. The system of claim 17 wherein dynamically generate parser classes and methods comprises:
for each property, reading associative values representing attributes of the property to generate a class variable; and
associating each class variable with accessor and mutator methods.

19. The system of claim 18, wherein the accessor and mutator methods perform all type-checking, bounds-checking, and format-checking required by the schema.

20. The system of claim 18 further comprising:
responsive to a presence of a validation attribute, adding validation information to the accessor or the mutator of the class variable to which the validation attribute corresponds.

21. The system of claim 18, wherein the accessor and mutator methods perform:
data transformations during serialization or deserialization.

22. The system of claim 17 further comprising:
generating a serialization method on the new parser class that converts the new parser class into a serialized format.

23. The system of claim 17 further comprising:
creating a new parser class for every object type in the schema and for the schema itself.

24. The system of claim 17, wherein dynamically generating parser classes and methods comprises:
for each union type, matching the property to defined types in an order that the defined types are listed in the schema; and
responsive to a match, using a matching defined type to create a class property.

* * * * *